Figure 2:
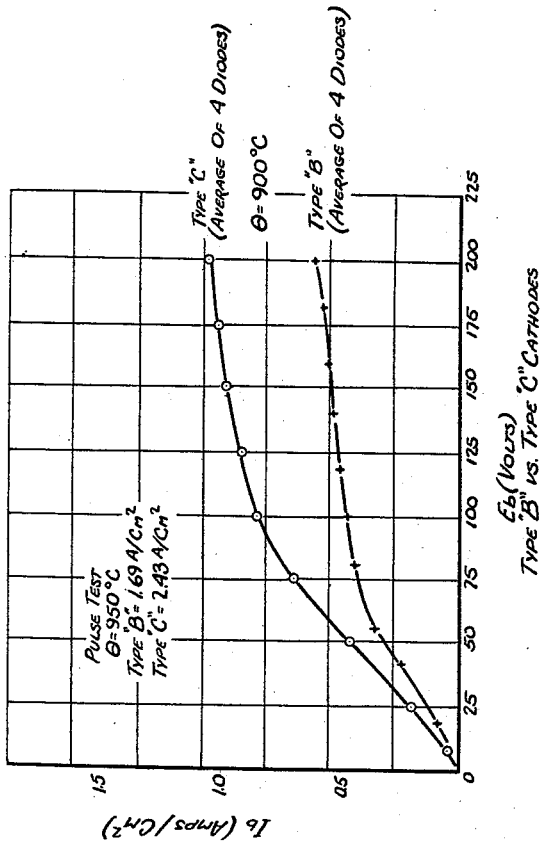

INVENTOR.
OTTO G. KOPPIUS
BY
Kenyon & Kenyon
ATTORNEYS

United States Patent Office 3,076,916
Patented Feb. 5, 1963

3,076,916
IMPREGNATED TUNGSTEN CATHODE STRUCTURES AND METHODS FOR FABRICATING SAME
Otto G. Koppius, Lexington, Ky., assignor to Semicon Associates, Inc., Lexington, Ky., a corporation of Kentucky
Filed Jan. 21, 1959, Ser. No. 788,072
8 Claims. (Cl. 313—346)

My invention relates generally to porous tungsten structures applicable to cathodes for electron discharge tubes and other devices involving the machining of tungsten. More particularly, the invention deals with improved dispenser cathodes incorporating an impregnated porous tungsten element and novel techniques for fabricating such elements.

In the patent to Lemmens and in the several patents to Levi (2,543,728; 2,669,008; 2,700,000 and 2,721,372) there are disclosed various forms of dispenser cathodes. Cathodes produced in accordance with the Lemmens patent are now more or less obsolete, whereas those based on the Levi patents are commercially acceptable and in general use. Essentially the Levi type of cathode consists of a porous tungsten bar impregnated with electron emissive material. Since my invention in many of its aspects constitutes a significant improvement over the Levi types of cathode, a brief review of the fabricating techniques employed by Levi may be helpful in understanding the principles underlying the present invention.

Levi first forms a porous tungsten bar by conventional metallurgical techniques, i.e., tungsten powder is compacted at high pressure and then sintered in a hydrogen atmosphere. In this state the tungsten bar is 80% to 86% of theoretical density and mechanically it is very hard and brittle. Since porous tungsten produced in this fashion is almost impossible to machine by ordinary lathe methods, it is then impregnated with a copper filler in a hydrogen atmosphere, the filler having lubricating properties. The filled tungsten bar may now be machined to any desired shape. Thereafter the copper filler is removed by evaporation in a suitable vacuum furnace. In addition to copper, gold and silver and their alloys are suggested by Levi as filler metals.

The machined porous tungsten piece thus formed is now impregnated with a suitable barium compound which fills all the pores of the tungsten to produce a dispenser cathode structure. Disclosed by Levi is a fused mixture of barium oxide and aluminum oxide containing about 60% to 90% by weight of barium oxide. Other oxides suggested are silicon dioxide, boric oxide and beryllium oxide. Specifically proposed by Levi is a molar ratio of 5:2 of barium oxide and aluminum oxide. Also suggested by Levi are such compounds as calcium oxide in combination with barium oxide and aluminum oxide, a molar ratio of 5:3:2 of barium oxide, calcium oxide and aluminum oxide being preferred.

I have found that the emission quality of dispenser cathodes of the above-described prior art type is dependent in large measure on the effective removal of the filler metal from the porous tungsten piece. In practice, however, complete removal of the filler is never possible and as a consequence the emission characteristic of such cathodes are relatively low and erratic. Furthermore such filler metal tends to evaporate slowly from the porous tungsten during the life of the tube incorporating the dispenser cathode. This evaporation has a deleterious effect on tube operation, for the copper will deposit in various unwanted spots within the tube structure and in some instances acts to short-circuit tube leads.

The copper filler-tungsten technique presents other serious limitations, particularly in forming tungsten to be used in dispenser cathode applications. In this instance it is essential to hold the density of the tungsten between 80% and 86% of theoretical, and at the same time the sintering temperature must be held as high as possible; i.e. at a 2150 C. minimum and preferably at 2350 C. Thus a special coarse tungsten powder must be chosen as a raw material. If the sintering temperature is too low then the machined tungsten part will shrink at the time the copper is removed. If on the other hand the tungsten powder is too fine then the density will be too high for cathode applications.

In view of the foregoing, it is the principal object of my invention to provide a novel technique for machining porous tungsten without the use of copper or other metal filler. A significant feature of my invention resides in the fact that impregnated tungsten pieces made without the use of metal fillers show a marked increase in emissions and have distinctly superior characteristics relative to existing dispenser cathodes.

More specifically it is an object of my invention to provide a technique for machining porous tungsten making use of a plastic filler which may be more readily and more completely removed as compared to copper and other filler metals. An important advantage in the use of a plastic filler lies in the fact that it may be evaporated at a relatively low temperature.

Also an object of the invention is to provide a novel impregnant composition for a porous tungsten piece which produces an exceptional improvement in emission results.

Figure 1:
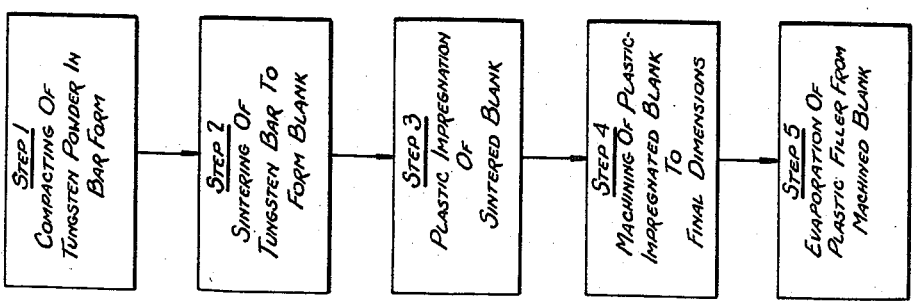

For a better understanding of the invention, as well as other objects and features thereof, reference is made to the following detailed description to be read in conjunction with the accompanying drawing, wherein:

FIG. 1 is a flow sheet illustrative of the method in accordance with the invention, and FIG. 2 is a graph showing the characteristics of a cathode fabricated in accordance with the invention.

The new technique in accordance with my invention first requires the formation of a porous tungsten bar by conventional metallurgical methods. Tungsten powder is pressed at about 20,000 pounds per square inch into a bar-shaped body (step 1). The body is then sintered (step 2) in the manner disclosed for example in the Levi Patent No. 2,669,008, but at substantially lower temperatures.

Instead of a copper filler, a plastic is used to impregnate the porous tungsten bar so as to facilitate machining (step 3). The nature of the plastic filler will be discussed later in the specification. I have found that such a tungsten bar impregnated with plastic can be machined with conventional tools. Once the tungsten has been machined to specification (step 4), the plastic can be removed by heating at a relatively low temperature, for example, 1000° C. for 5 minutes in a vacuum furnace (step 5). This time must be compared with 15 minutes at 1950° C. in the case of copper filler removal. Further, since the plastic can be removed at a much lower temperature (1000° C.) the original sintering temperature of the tungsten bar can be much lower, hence a less expensive and finer tungsten powder may be used as raw stock for the bar.

This conclusion depends on what the machined tungsten parts are intended for. It is important to bear in mind that the tungsten machining technique can be used to form not only cathodes wherein dimensional tolerances are very exacting, but also tungsten tubing, heat resistant hardware and in numerous other applications. If the machined tungsten is for dispenser cathodes, then a relatively low sintering temperature may be employed in view of the much lower plastic removal temperature.

But in high temperature applications, a low sintering temperature is not used.

A number of different plastics may be used for filler impregnation of tungsten bars. For dispenser cathode applications, the essential characteristics of the filler plastic are that it must polymerize and depolymerize with ease. That is to say it must set solidly from the liquid or gaseous phase and return readily to such a phase. Furthermore, it must not char or leave a carbon deposit within the tungsten pores. Suitable as a plastic filler for dispenser cathode tungsten pieces is methyl methacrylate which may be purchased commercially as a monomer.

Tungsten parts used for application other than dispenser cathodes can be impregnated with a plastic other than one which will depolymerize readily. The presence of a foreign deposit in some instances is not objectionable. In such case styrene, polyvinyls, co-polymers of styrene, etc. may be used. The plastic however must impregnate the tungsten bar completely and it must polymerize to a hard mass.

The proportion of methyl methacrylate monomer as a filler for porous tungsten shall now be considered. This monomer contains an inhibitor to prevent polymerization, which inhibitor must be removed before the monomer can be used to impregnate the tungsten bars.

A small quantity of the monomer is taken, say 100 cc. It is washed twice with 10% NaOH caustic solution, the first washing turning dark brown, the second being much lighter. The caustic is then removed in a separating funnel. The monomer is dried by the addition of about 10 grams of anhydrous sodium sulfate. The clear dry monomer is distilled once through a simple one plate column.

The distilled monomer will polymerize very slowly. It is necessary in order to induce more rapid polymerization to add an activator. For this purpose about 0.5% of benzoyl peroxide is more than sufficient. Most of the time it is necessary to heat the solution, if so, it should be done immediately.

The preparation of the porous tungsten bar for impregnation shall now be considered. There are many fine inter-connecting and non-connecting pores in a porous tungsten bar having a theoretical density between 80% and 88%. In order to machine such bar, it has been found necessary to fill a large fraction of these pores with the polymerized plastic. If this is not done, the bar will contain many hard spots and in general will machine poorly. To properly impregnate such a bar of tungsten requires, I have found, rather drastic vacuum treatment. This is particularly true if the bar is fairly large, say 1″ in diameter and 3″ long.

The vacuum treatment is carried out as follows: The porous tungsten bar is sealed in a suitable container which is evacuated by a pumping system to an ultimate vacuum of about $10^{-6}$ mm. To obtain this pressure it is necessary to outgas the tungsten bar by means of an inductive treating device.

Once the ultimate pressure is established and the bar is at room temperature, the liquid monomer is introduced under vacuum until the liquid more than covers the bar. Within three or four days, the monomer will polymerize into a hard mass. The resulting tungsten-plastic bar can then be machined with ease.

Once the tungsten-plastic bar is machined to specification it is necessary to remove the plastic from the pores. Methyl methacrylate is one of the few plastics which will depolymerize almost quantitatively when treated in vacuum. To accomplish this, the machined tungsten parts whose pores contain the plastic filler are placed in a vacuum furnace. The pressure in the vacuum furnace is reduced to about $10^{-5}$ to $10^{-6}$ mm. and the temperature slowly increased. After about 400° to 500° C. most of the plastic is depolymerized and at this temperature a huge amount of gas is given off. Once this initial burnt off gas has been removed and the original low pressure re-established, the temperature is again increased to about 1000° C. at which value it is held for about five minutes. From the weight gain-weight loss measurement on tungsten pellets, one must conclude that all plastic has been removed.

Tungsten parts impregnated with styrene provide similar results on removal of the plastic. However, more gas is evolved at the high temperature. Also weight gain-weight loss measurements indicate that more residue remains.

I have found that dispenser cathodes made from porous tungsten machined by the plastic technique disclosed herein have properties significantly better than cathodes manufactured by the copper filler method. Among the improvements obtained are substantially greater emission for any given temperature of operation as well as more consistent emission from lot to lot. Cathodes made in accordance with the invention show almost instantaneous activation and are less sensitive to residual gas within the tube and to ion bombardment as compared to prior art cathodes. Also there is no copper evaporation and substantially less barium evaporation at the same temperature.

FIG. 2 is a graph showing the general relationship found for both D.C. and pulsed emission. The curve marked Type B has reference to a standard cathode made by the copper filler method, the tungsten body being impregnated with barium oxide, calcium oxide and aluminum oxide in a molar ratio of 5:3:2 in the order named.

A striking improvement in emission results by the use of plastic machined porous tungsten when the active impregnant is changed from either of the 5:2 or 5:3:2 types mentioned above to a 4:1:1 type, i.e. 4 mols of barium oxide, 1 mol of calcium oxide and a 1 mol of aluminum oxide. If the basis for comparison is the standard type (5:3:2) made by the copper filler method, then the improvement is about 100% and twice the emission is obtained for any given temperature. In FIG. 2, the curved marked C refers to a cathode made by the plastic filler method disclosed herein and whose tungsten body contains an active impregnant of the type 4:1:1. It will be evident that the type C cathode exhibits markedly superior characteristics.

High density porous tungsten greater than 85.5% of theoretical does not accept aluminum oxide during the impregnation from a fused mixture of barium oxide, aluminum oxide. Thus, it is possible to fabricate dispenser cathodes with an impregnant containing from 90 to 100% barium oxide content.

While I have shown what are considered to be preferred embodiments of the invention, it will be understood that many changes may be made without departing from the essential scope of the invention as defined in the annexed claims.

What is claimed is:

1. A method of fabricating a machined tungsten body of desired shape and size for use in dispenser cathodes comprising the steps of compacting tungsten particles into a body, sintering the body to form an unmachinable sintered porous blank, impregnating the blank with a filler plastic in fluid form capable of polymerization and depolymerization without leaving a deposit, polymerizing the plastic impregnant to provide a lubricated tungsten surface, machining the plastic-impregnated blank to the desired shape and size, and evaporating the filler plastic at a temperature below said sintering temperature to remove the filler plastic entirely from the blank.

2. A method of fabricating a machined tungsten body of desired shape and size for use in a dispenser cathode comprising the steps of pressing a mass of tungsten particles into a body, heating the body at a given sintering temperature to form an unmachinable sintered porous blank, impregnating the blank with a filler plastic in liquid form capable of polymerization and depolymerization without leaving a deposit, polymerizing the plastic impregnant to provide a lubricated surface, machining the plastic-impregnated blank to the desired shape and size, and evaporating the filler plastic in a vacuum furnace at a temperature below said sintering temperature to remove the filler plastic entirely from the blank.

3. The method set forth in claim 2 wherein said plastic is constituted by methyl methacrylate.

4. A method of fabricating a machined tungsten body of desired shape and size for use in a dispenser cathode comprising the steps of pressing a mass of tungsten particles into a body, heating the body at a predetermined sintering temperature below 2150° C. to form an unmachinable sintered porous blank, impregnating the blank with a filler plastic in liquid form capable of polymerization and depolymerization without leaving a deposit, polymerizing the plastic impregnant to provide a lubricated tungsten surface, machining the plastic-impregnated blank to the desired shape and size, and evaporating the filler plastic at a temperature of approximately 1000° C. to remove the plastic entirely from the blank.

5. A method of fabricating a dispenser cathode of desired shape and size comprising the steps of pressing a mass of tungsten particles into a body, heating the body at a given sintering temperature to form an unmachinable sintered porous blank, impregnating the blank with a filler plastic in liquid form capable of polymerization and depolymerization without leaving a deposit, polymerizing the plastic impregnant to provide a lubricated tungsten surface, machining the plastic-impregnated blank to the desired shape and size, evaporating the filler plastic at a temperature below said sintering temperature to remove the plastic entirely and to provide a machined porous tungsten cathode blank, and impregnating the machined blank with emissive material.

6. The method as set forth in claim 5 wherein said emissive material is constituted by 4 mols of barium oxide, 1 mol of calcium oxide and 1 mol of aluminum oxide.

7. A method of fabricating a machined tungsten body of desired shape and size for use in a dispenser cathode comprising the steps of pressing a mass of tungsten particles into a body, heating the body at a given sintering temperature to form an unmachinable sintered porous blank, impregnating the blank with a filler plastic of a monomer of methyl methacrylate in liquid form capable of polymerization and depolymerization, polymerizing the plastic impregnant to provide a lubricated surface, machining the plastic impregnated blank to the desired shape and size, and evaporating the filler plastic at a temperature below said sintering temperature.

8. A dispenser cathode comprising a porous body of sintered tungsten whose pores are entirely free of filler material, and an emissive material impregnating said pores constituted by 4 mols of barium oxide, 1 mol of calcium oxide and 1 mol of aluminum oxide.

References Cited in the file of this patent

UNITED STATES PATENTS

| | | |
|---|---|---|
| 2,328,302 | Simison | Aug. 31, 1943 |
| 2,446,672 | Sirp | Aug. 10, 1948 |
| 2,700,000 | Levi et al. | Jan. 18, 1955 |